Figure 5:
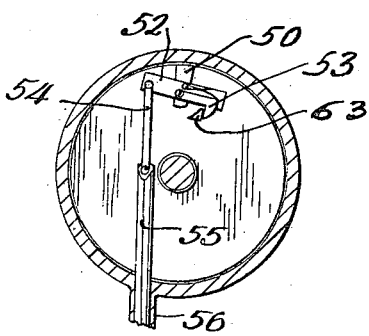

M. M. WINKLER.
SIGNAL LAMP.
APPLICATION FILED MAY 21, 1917.
1,269,032.
Patented June 11, 1918.
2 SHEETS—SHEET 1.
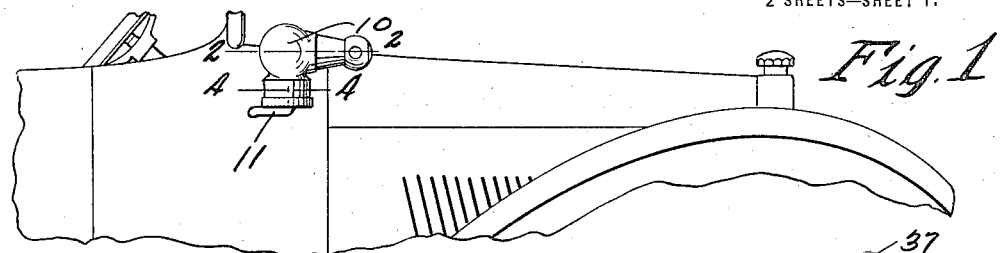
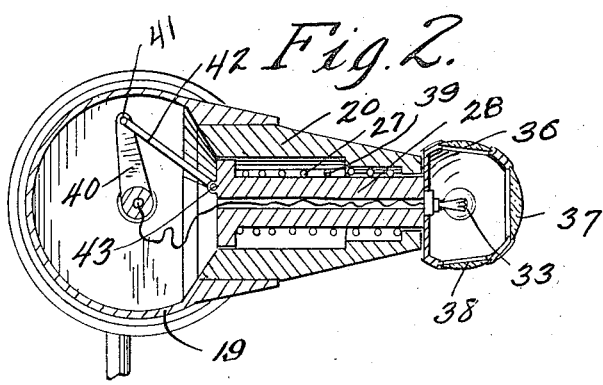
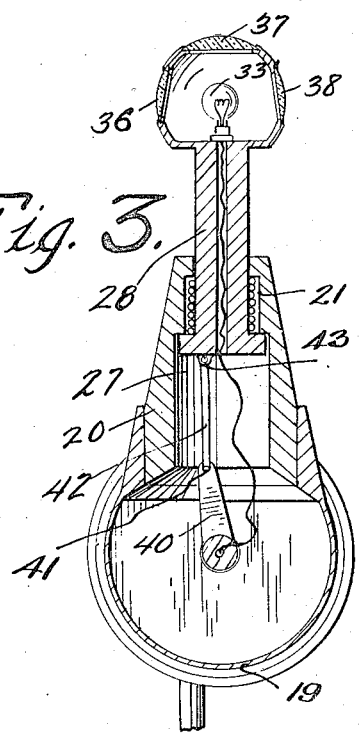
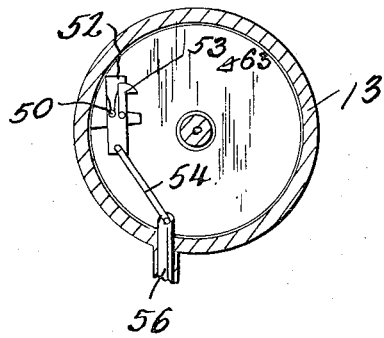
Witness
G. C. Walling
P. H. Pattison
Inventor
M. M. Winkler
By 
Attorney

M. M. WINKLER.
SIGNAL LAMP.
APPLICATION FILED MAY 21, 1917.

1,269,032.

Patented June 11, 1918.
2 SHEETS—SHEET 2.

Witnesses
G. C. Walling
P. H. Pattison

Inventor
M. M. Winkler,
By Chandler & Chandler
Attorney

UNITED STATES PATENT OFFICE.

MAUD M. WINKLER, OF SCHENECTADY, NEW YORK.

SIGNAL-LAMP.

1,269,032.  Specification of Letters Patent.  Patented June 11, 1918.

Application filed May 21, 1917. Serial No. 169,968.

*To all whom it may concern:*

Be it known that I, MAUD M. WINKLER, a citizen of the United States, residing at Schenectady, in the county of Schenectady, State of New York, have invented certain new and useful Improvements in Signal-Lamps; and I do hereby declare the following to be a full, clear, and exact description of the invention, such as will enable others skilled in the art to which it appertains to make and use the same.

This invention relates to new and useful improvements in direction indicators for motor vehicles, and has for its primary object to provide a combined direction indicator and side light.

A further object of the present invention is to provide a device of this character in which the side lights are constructed in such a manner as to be movable to indicate the intention of the driver to change the course of the motor vehicle.

A still further object is to provide a device that can be swung at an angle to the side of the vehicle and the lamp support extended for use as a direction indicator, and also swung parallel with the side of the vehicle and the lamp support retracted for use as a side light.

Figure 8:
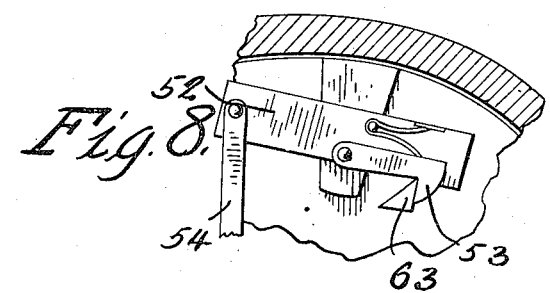
Figure 6:
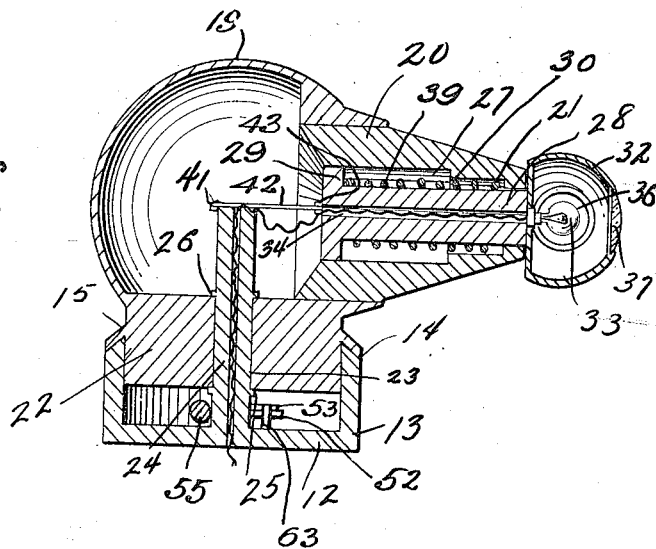
Figure 7:
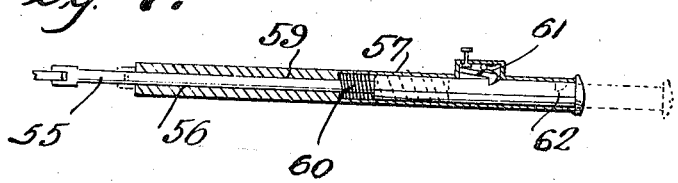

Referring to the drawings,

Figure 1, is a fragmentary view of the front portion of a motor vehicle with one of the side lights in place thereon, Fig. 2, is a sectional view on the line 2—2 of Fig. 1 showing the position of the parts when the device is used as a side light, Fig. 3, is a similar view showing the position of the parts when the device is used as a direction indicator, Fig. 4, is a sectional view on the line 4—4 of Fig. 1, showing one of the positions of the operating mechanism, Fig. 5, is a similar view showing the operating mechanism in another of its positions, Fig. 6, is a vertical sectional view of the lamp, Fig. 7, is a detail view of part of the operating mechanism, and, Fig. 8, is a detail view of another portion of the operating mechanism.

Referring more particularly to the drawings, the reference character 10 designates the lamp which is suitably secured to the front of a motor vehicle by means of a bracket or the like 11.

The lamp comprises a base member 12 which is formed with an annular flange 13, the upper edge of which is beveled as at 14, and revolubly mounted on the beveled edge of said flange is the lamp housing which latter is provided with a flange 15 which is adapted to engage the beveled edge 14 of the flange 13.

As shown in Fig. 6, the lamp housing 19 is provided with a right angular extension 20 which is provided with a longitudinal passage 21, and depending from the housing is a circular portion 22 which is adapted to be received within the base member 12. This circular portion 22 is provided with a concentric passage 23 through which projects a standard 24 on which is carried a collar 25 by means of which the circular member 22 is partially supported, and said circular member is retained against vertical movement on the standard 24 by means of a collar 26. The passage 21 through the right angular extension 20 is cut out as at 27, and slidably mounted in said passage is a telescoping lamp supporting member 28 which is provided with a shoulder 29 adapted to engage the shoulder 30 formed in the cut out portion, the engagement of the shoulder 29 limiting the outward movement of the member 28. Mounted on the outer end of the member 28 is a housing 32, and in said housing is a lamp. The member 28 is provided with a longitudinal passage 34 through which the means for conveying energy to the lamp are adapted to pass. The housing 32 is provided with three lenses 36, 37, and 38, the lenses 36 and 38 being preferably colored, while the lens 37 is clear. Mounted between the end wall of the passage through the right angular telescopic extension 20 and the shoulder 29 of the member 28 is a coil spring 39 the purpose of which will be hereinafter set forth.

As shown in Figs. 2 and 3 the standard 24 is provided with a rigid arm 40 and pivotally connected as at 41 to said rigid arm is a link 42 which in turn is pivotally connected as at 43 to the member 28 for a purpose to be hereinafter described.

As shown in Figs. 4, 5, and 8 a bracket 50 is carried by the lower surface of the circular member 22. Pivoted to this bracket is a supporting member 52 on which a spring pressed pawl 53 is pivoted. One end of said supporting member 52 is connected by a link 54 to one end of an operating rod 55. This operating rod is enlarged at one end and is slidably mounted in an extension 56 of the base 12, the extension having a bore 57 which is reduced as at 59 to limit the inward movement of the enlarged portion of the operating rod 55. Disposed between the end wall of the enlarged portion of the bore 57, and one end of the enlarged portion of the operating rod 55, is a coil spring 60 which is intended to force the rod outwardly of the extension. Mounted on the extension 56 is a manually operated spring catch 61 which engages notches 62 in the operating rod to hold the rod in the extension against the tension of the spring. The pawl 53 is intended to engage a stop lug 63 carried by the base 12 so as to hold the different parts in their inoperative position.

In the use of the device as a side light, the operating rod 55, is retained in the extension 56 by the catch 61 so as to permit the pawl to engage the stop lug 63 to hold the device in a position parallel with the side of the vehicle to which it is attached, so that the lens 37 will project the rays of light forwardly. When it is desired to indicate the driver's intentions to change his direction, the catch 61 is operated to release the rod 55 and permit the latter to release the pawl 53 from engagement with the stop lug 63 through the medium of the spring 60. This action rotates the lamp housing 19 to a position at right angles to the side of the vehicle. During this operation, the telescopic lamp support 28 is extended by means of the lever 40 and link 42 and thereby projects the rays from the lens 36 and 38 so that they may be readily observed by persons approaching from both ends of the vehicle, thus indicating the change of direction.

It will be readily seen that when the lamp housing 19 revolves upon its axis, owing to the fact that the standard 24 is stationary and the lever 40 is rigidly secured thereto, the link 42 will extend the telescopic lamp support 28 against the tension of the coil spring 39 thereby moving the lamp to a position where it is more plainly visible to occupants of following vehicles. This projected position is shown in Fig. 3.

From the foregoing it will be seen that the present invention provides a side light for motor vehicles which is also capable of use as a direction indicator, as well as a device of this character which is simple in both construction and operation.

Having thus described the invention, what is claimed, is:

1. A combined side light and direction indicator, comprising a stationary base including a standard, a movable lamp housing mounted on said base, a movable lamp support carried by said lamp housing, said lamp support being operatively engaged with said stationary standard and arranged to be drawn into the housing when the latter is moved in one direction and moved out of the housing when the latter is moved in the opposite direction, and resilient operating means connected to said housing for rotating the same.

2. A combined side light and direction indicator, comprising a stationary base and standard, a movable lamp housing mounted on said base, a telescoping lamp support carried by said housing, and operatively connected to the standard, resilient means for holding the telescopic lamp support retracted for use as a side light, and resilient operating means connected to said lamp housing for rotating the latter to extend said telescopic lamp support for use as a direction indicator.

3. A combined side light and direction indicator, comprising a stationary base and standard, a lamp housing rotatably mounted in said base, a telescoping lamp support mounted in said housing and operatively connected to the standard, resilient means carried by said lamp support for holding the same in its retracted position for use as a side light, a stop lug carried by the base, a supporting member pivoted to the housing, a spring pressed pawl pivoted to said member and arranged to engage the stop lug when the lamp is used as a side light, a spring operated lever movably mounted in said base and operatively connected to said supporting member, and a catch carried by said base for releasing the spring pressed lever and permitting the lamp housing to rotate and extend the telescopic lamp support for use as a direction indicator.

4. A combined side light and direction indicator, comprising a stationary base and spindle, a lamp housing rotatably mounted in said base at spaced relation to the bottom of said base to form a compartment, a telescoping lamp support extending from one side of said housing, a lever secured at one end to said stationary standard and movably connected at its other end to the telescoping lamp support, resilient means carried by said lamp support for holding the same in its retracted position for use as a side light, a stop lug carried by said base within the compartment, a supporting member pivoted to the lower surface of the lamp housing within the compartment, a spring pressed pawl pivoted to said supporting member and arranged to engage the stop lug when the lamp is used as a side light, a spring operated lever extending into the compartment and operatively connected to the supporting member, and a catch carried by the base and operatively engaged with the lever for releasing the latter and permitting the lamp housing to rotate and extend the telescopic lamp support for use as a direction indicator.

In testimony whereof, I affix my signature in the presence of two witnesses.

MAUD M. WINKLER.

Witnesses:
JAMES E. SLOCUM,
MARY SLOCUM.

Copies of this patent may be obtained for five cents each, by addressing the "Commissioner of Patents, Washington, D. C."